(12) United States Patent
Hu

(10) Patent No.: US 11,627,369 B2
(45) Date of Patent: Apr. 11, 2023

(54) VIDEO ENHANCEMENT CONTROL METHOD, DEVICE, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Xiaopeng Hu, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 44 days.

(21) Appl. No.: 17/329,100

(22) Filed: May 24, 2021

(65) Prior Publication Data
US 2021/0281911 A1 Sep. 9, 2021

Related U.S. Application Data

(63) Continuation of application No. PCT/CN2019/102862, filed on Aug. 27, 2019.

(30) Foreign Application Priority Data

Nov. 27, 2018 (CN) .......................... 201811429235.7

(51) Int. Cl.
*H04N 21/4402* (2011.01)
*H04N 21/442* (2011.01)
(52) U.S. Cl.
CPC ... *H04N 21/4402* (2013.01); *H04N 21/44204* (2013.01)
(58) Field of Classification Search
CPC ......... H04N 21/4402; H04N 21/44204; H04N 21/23439; H04N 21/44008;
(Continued)

(56) References Cited

U.S. PATENT DOCUMENTS 6,920,567 B1 * 7/2005 Doherty ................ G06F 21/105
713/168
9,615,112 B2 4/2017 Qian et al.
(Continued)

FOREIGN PATENT DOCUMENTS

CN 102204272 A 9/2011
CN 103338401 A 10/2013
(Continued)

OTHER PUBLICATIONS

Supplementary Search Report dated Mar. 24, 2022 From the Extended European search report(EESR) of the Application No. 19889127.7, 9 pages.
(Continued)

*Primary Examiner* — Benjamin R Bruckart
*Assistant Examiner* — Akshay Doshi
(74) *Attorney, Agent, or Firm* — Bayes PLLC

(57) ABSTRACT

A video enhancement control method, an electronic device, and a storage medium are provided. The method includes obtaining a resolution of a video being played in response to detecting the electronic device being in a video playing state, determining whether a network state meets a playback condition corresponding to the resolution, and if the network state does not meet the playback condition, reducing the resolution of the video being played and performing a video enhancement on the video being played. The video enhancement comprises enhancing images of the video being played.

19 Claims, 7 Drawing Sheets

(58) Field of Classification Search
CPC ....... H04N 21/440263; H04N 21/4424; H04N 21/44209; H04N 21/443; H04N 21/4621
See application file for complete search history.

(56) References Cited

U.S. PATENT DOCUMENTS

| | | | | |
|---|---|---|---|---|
| 2002/0180752 | A1* | 12/2002 | Chernega | H04N 5/268 345/589 |
| 2012/0218312 | A1* | 8/2012 | Goldsmith | G09G 3/344 345/690 |
| 2012/0320966 | A1* | 12/2012 | Guo | H04N 19/102 375/E7.169 |
| 2013/0249959 | A1* | 9/2013 | Umehara | H04N 9/3144 353/52 |
| 2014/0136686 | A1 | 5/2014 | Tsai et al. | |
| 2015/0215832 | A1* | 7/2015 | Fitzpatrick | H04W 48/14 455/426.1 |
| 2016/0248684 | A1* | 8/2016 | Parthasarathy | H04L 67/56 |
| 2017/0287433 | A1 | 10/2017 | Majid | |
| 2017/0295272 | A1* | 10/2017 | Gan | H04M 1/725 |
| 2017/0302990 | A1 | 10/2017 | Ying | |
| 2018/0059465 | A1* | 3/2018 | Kou | G02F 1/13471 |

FOREIGN PATENT DOCUMENTS

| | | |
|---|---|---|
| CN | 103945240 A | 7/2014 |
| CN | 104010232 A | 8/2014 |
| CN | 105204734 A | 12/2015 |
| CN | 105263066 A | 1/2016 |
| CN | 105392029 A | 3/2016 |
| CN | 105592322 A | 5/2016 |
| CN | 105654446 A | 6/2016 |
| CN | 105812711 A | 7/2016 |
| CN | 105979367 A | 9/2016 |
| CN | 106162224 A | 11/2016 |
| CN | 106791927 A | 5/2017 |
| CN | 108111910 A | 6/2018 |
| CN | 109688465 A | 4/2019 |
| GB | 2562536 A | 11/2018 |
| JP | 2010199820 A | 9/2010 |
| KR | 20150122656 A | 11/2015 |

OTHER PUBLICATIONS

First Examination Report dated Mar. 7, 2022 from the Indian Application No. 202127028511, 6 pages.
The first Office Action dated Nov. 28, 2019 from from China Application No. 201811429235.7.
The second Office Action dated Mar. 31, 2020 from from China Application No. 201811429235.7.
The third Office Action dated Jul. 15, 2020 from from China Application No. 201811429235.7.
Notice of Allowance dated Sep. 28, 2020 from from China Application No. 201811429235.7.
International Search Report and the Written Opinion dated Nov. 27, 2019 From the International Searching Authority Re. Application No. PCTCN2019102862.
Notification of rectification for notification to Grant Patent Right for Invention dated Oct. 12, 2020 from from China Application No. 201811429235.7.
Notice of Reasons for Refusal dated Jul. 5, 2022 from the Japanese Application No. 2021-529859.
Notice of Allowance dated Oct. 4, 2022 from the Japanese Application No. 2021-529859.
Notice of Preliminary Rejection dated Feb. 1, 2023. from the Korean Application No. 10-2021-7019549.

* cited by examiner

VIDEO ENHANCEMENT CONTROL METHOD, DEVICE, ELECTRONIC DEVICE, AND STORAGE MEDIUM

CROSS REFERENCE TO RELATED APPLICATIONS

This application is a continuation application of International Application No. PCT/CN2019/102862, filed Aug. 27, 2019, which claims the benefit of priority to Chinese Application No. 201811429235.7, filed on Nov. 27, 2018, the entire contents of which are incorporated herein by reference.

BACKGROUND

The present disclosure relates to the field of image processing technologies, and particularly to a video enhancement control method, a device, an electronic device, and a storage medium.

With the development of society, an application of electronic devices with screens has been continuously expanding. The electronic devices may, for example, use the screen to display images, such as pictures and videos. A display performance of most electronic devices may be severely affected by changes in surrounding light sources or a performance of a source of a video being played.

SUMMARY

In view of the above issues, the present disclosure provides a video enhancement control method, a device, an electronic device, and a storage medium to improve the above issues.

In a first aspect of the present disclosure, a video enhancement control method configured to be applied to an electronic device, includes obtaining a resolution of a video being played in response to detecting the electronic device being in a video playing state, determining whether a network state meets a playback condition corresponding to the resolution, and if the network state does not meet the playback condition, reducing the resolution of the video being played and performing a video enhancement on the video being played, and the video enhancement including enhancing images of the video being played.

In a second aspect of the present disclosure, an electronic device includes one or more processors, a video codec, and a memory, and one or more program instructions stored in the memory and executable by the one or more processors to perform the above method.

In a third aspect of the present disclosure, a computer readable storage medium stores one or more program codes executable by a processor to perform the above method.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and a person of ordinary skill in the art may still derive other drawings from these accompanying drawings without creative efforts.

DETAILED DESCRIPTION

Technical solutions in embodiments of the present disclosure will be clearly and completely described below in conjunction with drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within a protection scope of the present disclosure.

As a hardware performance of electronic devices improves, more electronic devices can support video playback. For example, the electronic device can run a video playback client, and then play a video requested from a network through the video playback client, or the electronic device can run a web browser, and then play the video in the web browser, or the electronic device can play locally stored video files through a video playback software.

Regardless of whether the video is transmitted and played on the network or stored locally, when the video is generated, in order to reduce a storage space occupation and facilitate transmission on the network, the generated video can be compressed. Correspondingly, when the electronic device acquires the video, the first acquired video can also be the compressed and encoded video. In this case, the electronic device can first perform video decoding on the compressed and encoded video.

Figure 1:
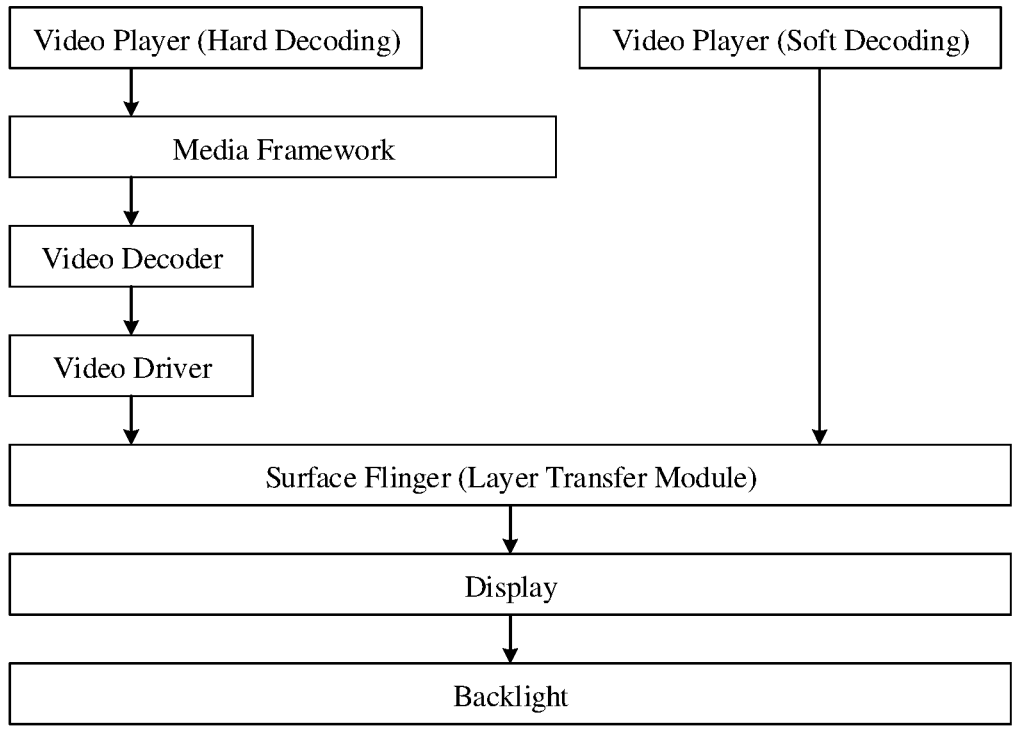
FIG. 1 is a schematic diagram of a video processing architecture according to an embodiment of the present disclosure.

For example, as illustrated in FIG. 1, an electronic device can perform video decoding in two ways: hard decoding and soft decoding. Hard decoding refers to a use of non-central processing unit (CPU) decoding, such as a graphics processing unit (GPU), a dedicated digital signal processor (DSP), a field programmable gate array (FPGA), an application specific integrated circuit (ASIC) chip, etc. Soft decoding refers to a use of CPU for decoding.

In details, as illustrated in FIG. 1, a multimedia framework obtains a video file to be played through an application programming interface (API) with a client or a web browser and submits the video file to be played to a video decoder). The media framework is a multimedia framework in an operating system.

Regardless of whether it is hard decoding or soft decoding, after a video data is decoded, the decoded video data can be sent to a surface flinger (layer transfer module), and the decoded video data can be rendered and synthesized by the surface flinger, and then displayed on a screen. The surface flinger is an independent service. The surface flinger receives all surfaces as an input and calculates a position of each surface in a final composite image according to parameters such as ZOrder, transparency, size, and position. The surface flinger is then handed over to HWComposer or OpenGL to generate a final display buffer, and then displayed on a specific display device.

The inventor discovers that a visual enhancement process can be added to either a hard decoding process or a soft decoding process, such that a subsequently video being played has a higher visual performance. For example, hollywood quality video (HQV) technology is used to remove edges of the video, adjust an exposure, or improve a definition. In addition, other ways can also be used to improve a visual experience of the video being played, for example, to enhance vividness of colors.

However, the inventor further discovers that a way to control whether to visually enhance a video being played needs to be improved. Therefore, a video enhancement control method, a device, an electronic device, and a storage medium that can improve control convenience and intelligence provided by the present disclosure are proposed.

The content of the present disclosure will be introduced below in conjunction with specific embodiments.

Figure 2:
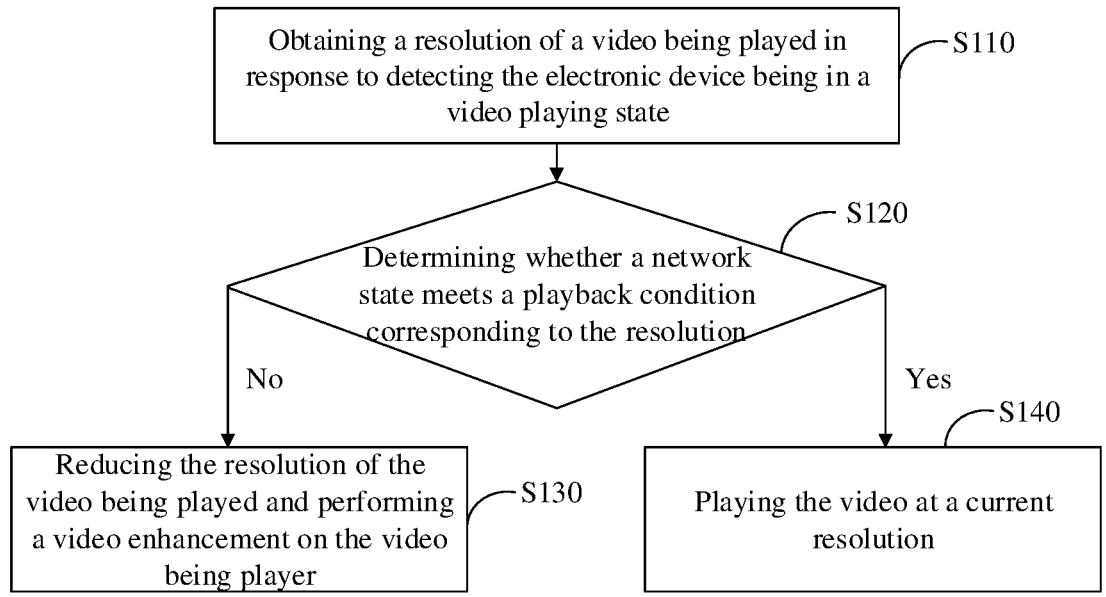
FIG. 2 is a flowchart of a video enhancement control method according to an embodiment of the present disclosure.

Referring to FIG. 2, in some embodiments of the present disclosure, a video enhancement control method configured to be applied to an electronic device, includes the following.

Step S110: obtaining a resolution of a video being played in response to detecting the electronic device being in a video playing state. In some embodiments of the present disclosure, the electronic device can identify whether the electronic device is in a video playing state in a variety of ways.

As a way, a step of detecting whether the electronic device is in the video playing state includes detecting whether a set video playing application is running in the electronic device, if it is detected that the set video playing application is running, determining that the electronic device is in the video playing state. The electronic device may pre-establish a list of video playing applications, so as to record the video playing applications in the list. The list can be freely configured by a user of the electronic device or can be determined according to a usage of a certain video playing application.

Figure 3:
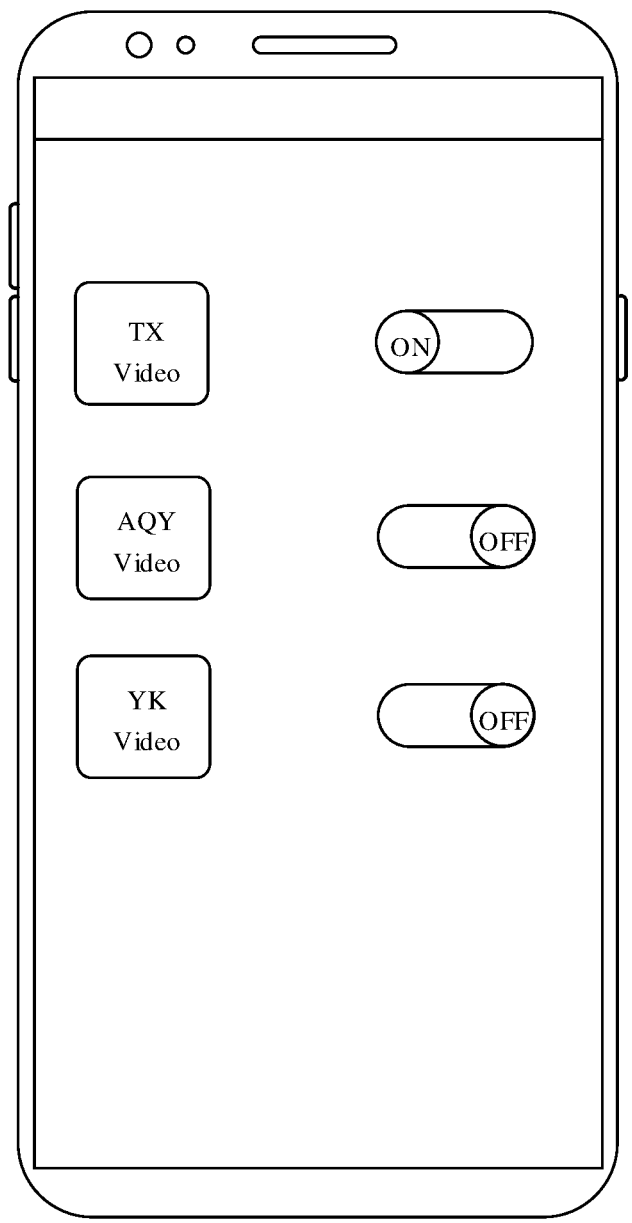
FIG. 3 is a schematic diagram of a switch of an application program according to an embodiment of the present disclosure.

For example, as illustrated in FIG. 3, a plurality of application programs and a corresponding state of each application program are displayed in an interface illustrated in FIG. 3. It is understandable that if the state corresponding to the application program is "off" as illustrated in the figure, it means that the application program is removed or not added to the above list. If the state corresponding to the application program is "on" as illustrated in the figure, it means that the application program has been added to the above list. For example, for an application program named "TX video," its corresponding state is "on," which means that the application program "TX video" exists in the above list. As for the application program named "AQY video," its corresponding state is "off," which means that the application program "AQY video" does not exist in the above list.

Furthermore, the electronic device can detect a frequency of use of each video playing application. If it is detected that the frequency of use of a certain video playing application exceeds a set frequency, the video playing application can be added to the above list. Correspondingly, the state corresponding to the name of the video playing application in FIG. 3 is configured as "on."

In this case, the electronic device can first detect which application program is currently running in a foreground, and then further detect whether the application program currently running in the foreground is in the list. If yes, then it is determined that the electronic device is currently in the video playing state. As a way, if the electronic device is an Android operating system, the name of the application program currently running in the foreground can be obtained by executing getRunningTasks method of ActivityManager. In addition, the electronic device may also obtain a list of application programs used by a user through UsageStatsManager and identify the most recently used application program recorded in the list as a current foreground application. Furthermore, a change of window focus can be monitored through Android's own barrier-free function and get a package name corresponding to the focused window as the application program currently running in the foreground.

As another way, the electronic device can also detect a return value of AudioManager class to determine whether there is a video playing. In this case, the electronic device can first check the return value of the AudioManager class to determine whether there is audio output. If it is detected that there is audio output, it is further determined whether the electronic device is in the video playing state according to the detection of whether there is a video playing application running.

Figure 4:
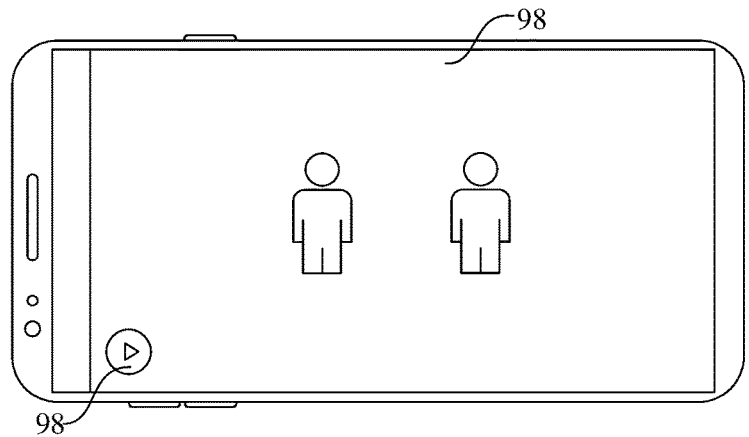
FIG. 4 is a schematic diagram of a video playback interface according to an embodiment of the present disclosure.

Furthermore, as yet another way, the electronic device can also detect whether the electronic device is in the video playing state by detecting a touch state of a video playback button. For example, as illustrated in FIG. 4, a play button 98 is displayed in a video playback interface 99 as illustrated in FIG. 4, and an interface as illustrated in FIG. 4 is in a state where a video playback is paused. In this case, when it is detected that the play button 98 is touched, it can be determined that the electronic device is currently in the video playing state.

In some embodiments of the present disclosure, there are multiple ways for the electronic device to obtain a resolution of the video being played. As a way, the electronic device can obtain the resolution of the video being played by performing image identification on a screen of the video being played. For example, the electronic device may obtain a frame of image from the video being played, identify the image, then obtain the resolution of the frame of image, and use the resolution as a resolution of a currently video being played.

Furthermore, the video being played can be divided into multiple parts. For example, some online videos may include an advertisement part and a video content part. The video content part is a part that characterizes a content to be expressed by the video. For example, for some TV series videos, the TV series videos may include a title advertisement in a front part. Then, if an image collected by the electronic device when collecting a certain frame of image is part of the title advertisement, the obtained image may be irrelevant to the video content, and the resolution of the video being played cannot be accurately obtained.

As a way, after detecting that the electronic device is in the video playing state, the electronic device directly obtains a frame of image of a middle part of the video being played according to a duration of the video being played. The middle part is a middle part of an entire video time length. For example, if the entire time length of the video being played is 60 minutes, then the middle part is the 30th minute part. As another way, if a title and the video content part of the video being played can be identified, the electronic device can acquire a certain frame of image to detect the resolution during a process of detecting the playback video content part.

As yet another way, the electronic device may, after detecting that the currently played video has been played for a designated period of time, acquire a certain frame of image in the video content after the designated period of time to detect the resolution. It is understandable that the title advertisement of the video may be 60 seconds to 80 seconds, and the electronic device can use the time length of the title advertisement obtained by statistics as a designated duration.

In addition, the electronic device can not only obtain a resolution bit rate by directly detecting the video being played, but also obtain the resolution bit rate through a resolution selection control. It is understandable that in the case that the video being played supports multiple levels of resolution, the user can operate the resolution selection control to select the resolution he needs. For example, in the case that the video being played supports ultra-definition, high-definition, and standard-definition, the user can select the video to play at an ultra-definition resolution through the resolution selection control. Then, after the user selects the ultra-definition resolution, the electronic device can store a result of the selection locally. Then the electronic device can determine the resolution of the currently video being played by reading the result of the selection. That is, the resolution corresponding to the resolution selection control selected by the user is determined as the resolution corresponding to the currently video being played.

As a way, a definition of video can be divided into multiple levels. For example, blue-ray, ultra-definition, high-definition, etc. However, different video producers may have different grading methods for the levels of the videos. Or due to a wrong setting, the resolution corresponding to the video may not be an actual resolution of the video. For example, the actual resolution of a certain video is high-definition, and due to a configuration error, the resolution assigned to the video can be ultra-definition, and the configured resolution of the video can be different from the actual resolution. In this case, even if the user selects ultra-definition, the actual resolution of the video being played is high definition when the electronic device is playing the video, which may cause the electronic device to obtain a wrong resolution during a process of obtaining the resolution of the video being played.

As a way, in the process of obtaining the resolution of the video being played, a resolution of a certain frame of the video being played is directly detected as a first resolution to be compared, and a result of a resolution selected by a user stored locally is also obtained as a second resolution to be compared. Then, the first resolution to be compared and the second resolution to be compared are compared. In the case where the first resolution to be compared and the second resolution to be compared are the same, any one of the first resolution to be compared and the second resolution to be compared is used as a resolution corresponding to the video being played. In the case where the first resolution to be compared and the second resolution to be compared are not the same, the first resolution to be compared is used as the resolution corresponding to the video being played.

Step S120: determining whether a network state meets a playback condition corresponding to the resolution. It is understandable that a video may composed of multiple frames of images. For images, an amount of data corresponding to different resolutions is different. A required transmission network bandwidth is different for different data volumes. For example, the network bandwidth required for blue-ray, ultra-definition, and high-definition decreases sequentially. As a way, the network state can be characterized by the network bandwidth. In this case, when the electronic device determines the resolution of the video being played, it is based on a playback condition that can obtain the resolution of the video being played, where the playback condition includes the transmission rate corresponding to the video being played. The transmission rate is the lowest network data transmission rate for smoothly transmitting the video of the resolution.

As a way, the transmission rate corresponding to a certain resolution can be pre-configured and stored in the electronic device. In this way, after obtaining the resolution of the video being played, the electronic device can obtain the transmission rate corresponding to the resolution of the video being played locally.

Then in this case, the electronic device can obtain the transmission rate of a currently connected network, and then compare a current transmission rate of the currently connected network with a transmission rate corresponding to the resolution of the video being played. If the transmission rate of the currently connected network is not less than the transmission rate corresponding to the resolution of the video being played, then it is determined that the network state meets the playback condition corresponding to the resolution. If the transmission rate of the currently connected network is less than the transmission rate corresponding to the resolution of the video being played, then it is determined that the network state does not meet the playback condition corresponding to the resolution.

Step S130: if the network state does not meet the playback condition, reducing the resolution of the video being played and performing a video enhancement on the video being played, and the video enhancement including enhancing images of the video being played. As a way, image parameters of the video being played can be adjusted to enhance the image.

The image parameter includes at least one of a definition adjustment parameter, a lens distortion control parameter, a color gamut control parameter, a color adjustment parameter, a sharpness adjustment parameter, a brightness adjustment parameter, a contrast adjustment parameter, a noise reduction control parameter, and a saturation adjustment parameter. As a way, the image parameters to be adjusted can be determined according to a degree of resolution reduction. For example, if a resolution is reduced to a greater degree, then more parameters can be used. Optionally, if a resolution is reduced from ultra-definition to standard-definition, the electronic device can adjust definition adjustment parameter, the sharpness adjustment parameter, and the brightness adjustment parameter of the video being played. If the electronic device reduces the resolution from ultra-definition to high definition, then the electronic device can be configured to adjust the definition adjustment parameter of the video being played.

Step S140: if the network state meets the playback condition, the video is played at a current resolution.

Some embodiments of the present disclosure provide a video enhancement control method. The method includes obtaining a resolution of a video being played in response to detecting the electronic device being in a video playing state, determining whether a network state meets a playback condition corresponding to the resolution, and if the network state does not meet the playback condition, reducing the resolution of the video being played and performing a video enhancement on the video being played. The method reduces a resolution of a currently video being played when detecting that a current network state does not meet the resolution of the video being played, so as to adapt to the current network state. The method also includes turning on a video enhancement, such that even when a network does not support a current resolution, the video being played can still have a higher playback visual performance, which improves a user experience.

Figure 5:
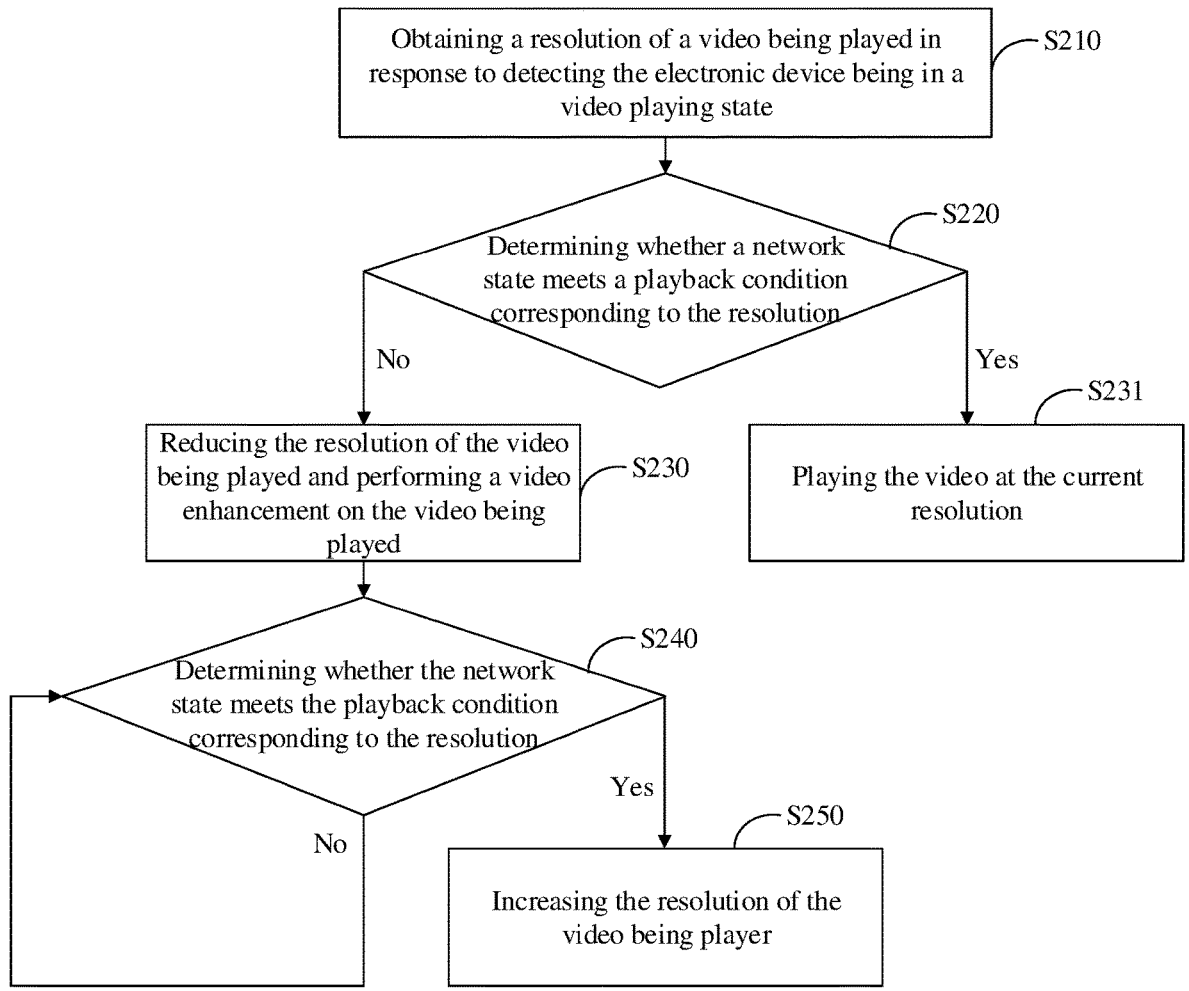
FIG. 5 is a flowchart of a video enhancement control method according to another embodiment of the present disclosure.

Referring to FIG. 5, some embodiments of the present disclosure provide a video enhancement control method configured to be applied to an electronic device, including the following.

Step S210: obtaining a resolution of a video being played in response to detecting the electronic device being in a video playing state.

Step S220: determining whether a network state meets a playback condition corresponding to the resolution.

Step S230: if the network state does not meet the playback condition, reducing the resolution of the video being played and performing a video enhancement on the video being played.

Step S231: if the network state meets the playback condition, the video is played at the current resolution.

Step S240: determining whether the network state meets the playback condition corresponding to the resolution.

After performing the step S230, the electronic device can still periodically check the current network state, and after detecting that the current network state meets the playback condition, the resolution of the video being played can be increased.

Step S250: increasing the resolution of the video being played if determining that the current network state meets the playback condition.

As a way, if it is determined that the current network state meets the playback condition, the resolution of the video being played is increased to a target resolution.

For the target resolution, the electronic device can be determined in many ways. Optionally, the electronic device can be randomly upgraded to a higher resolution than a previously reduced resolution. Optionally, the electronic device can increase the resolution to a resolution previously selected by the user. It is understandable that the user selects a desired resolution before or during the video playback. After the electronic device determines that the network state does not support the playback condition of the resolution selected by the user, the electronic device can reduce the resolution selected by the user. When the electronic device detects that the current network state supports the playback condition of the resolution selected by the user, the electronic device can switch the resolution of the video being played to the resolution selected by the user.

For example, if the resolution selected by the user is ultra-definition, and the electronic device detects that the current network status does not meet the ultra-definition playback conditions, the resolution can be reduced to high-definition for playback. When the electronic device detects that the current network state meets the ultra-definition playback conditions, the video resolution can be increased from high-definition to ultra-definition.

As a way, if it is determined that the current network state meets the playback condition, after the step of increasing the resolution of the video being played, the method further includes stopping performing the video enhancement on the video being played.

It is understandable that after the video enhancement is performed on the video, a visual performance of the video being played can be improved to a certain extent. For example, as an enhancement method, the electronic device can sharpen the video being played, thereby improving a definition of the video being played. As another enhancement method, the electronic device can enhance a saturation of the video being played, thereby making a color of the video being played fuller. In some scenarios, users can perceive a start and a stop of the video enhancement. Then, as a way, the step of stopping performing the video enhancement of the video being played includes obtaining a parameter of a video image, determining a time to turn off the video enhancement based on the parameter, and turning off the video enhancement of the video being played when the time starts.

Optionally, the step of determining the time to turn off the video enhancement based on the parameter: determining whether a brightness of the video image is lower than a designated brightness, and if determining that the brightness of the video image is lower than the designated brightness, a time when the brightness of the video image is detected to be lower than the designated brightness is regarded as the time to turn off the video enhancement.

Optionally, if the step of determining that the brightness of the video image is lower than the designated brightness, the time when the brightness of the video image is detected to be lower than the designated brightness is regarded as the time to turn off the video enhancement includes: if determining that the brightness of the video image is lower than the designated brightness, obtaining multiple frames of video images after the time when the brightness of the video image is detected to be lower than the designated brightness, calculating a duration of a brightness lower than the designated brightness based on a brightness of the multiple frames of video images, and if determining that the duration is greater than a designated duration, a time when the brightness of the video image is detected to be lower than the designated brightness is regarded as the time to turn off the video enhancement.

It is understandable that when the brightness of the video image is lower than the designated brightness, a user identification of the content of the video image is worse than when the brightness of the video image is higher than the designated brightness. For example, when the content displayed on the video image is in the daytime, a user perception is more sensitive to whether the video image is clear. When the content displayed on the video image is at night, the user has a poor perception of the definition of the video. In this case, if the time when the brightness of the video image is detected to be lower than the designated brightness is regarded as the time to turn off the video enhancement, a probability of user identification can be reduced when the video enhancement is turned off. This makes it possible to complete a shutdown of the video enhancement when the user has no or little perception, so as to improve a user experience.

Some embodiments of the present disclosure provide a video enhancement control method. The method includes obtaining a resolution of a video being played in response to detecting the electronic device being in a video playing state, determining whether a network state meets a playback condition corresponding to the resolution, and if the network state does not meet the playback condition, reducing the resolution of the video being played and performing a video enhancement on the video being played. When it is detected that the network meets the playback condition again, the resolution of the video being played is increased, and the video enhancement performance is reduced according to the increase in resolution, thereby reducing power consumption. The method reduces a resolution of a currently video being played when detecting that a current network state does not meet the resolution of the video being played, so as to adapt to the current network state. The method also includes turning on a video enhancement, such that even when a network does not support a current resolution, the video being played can still have a higher playback visual performance, which improves a user experience.

Figure 6:
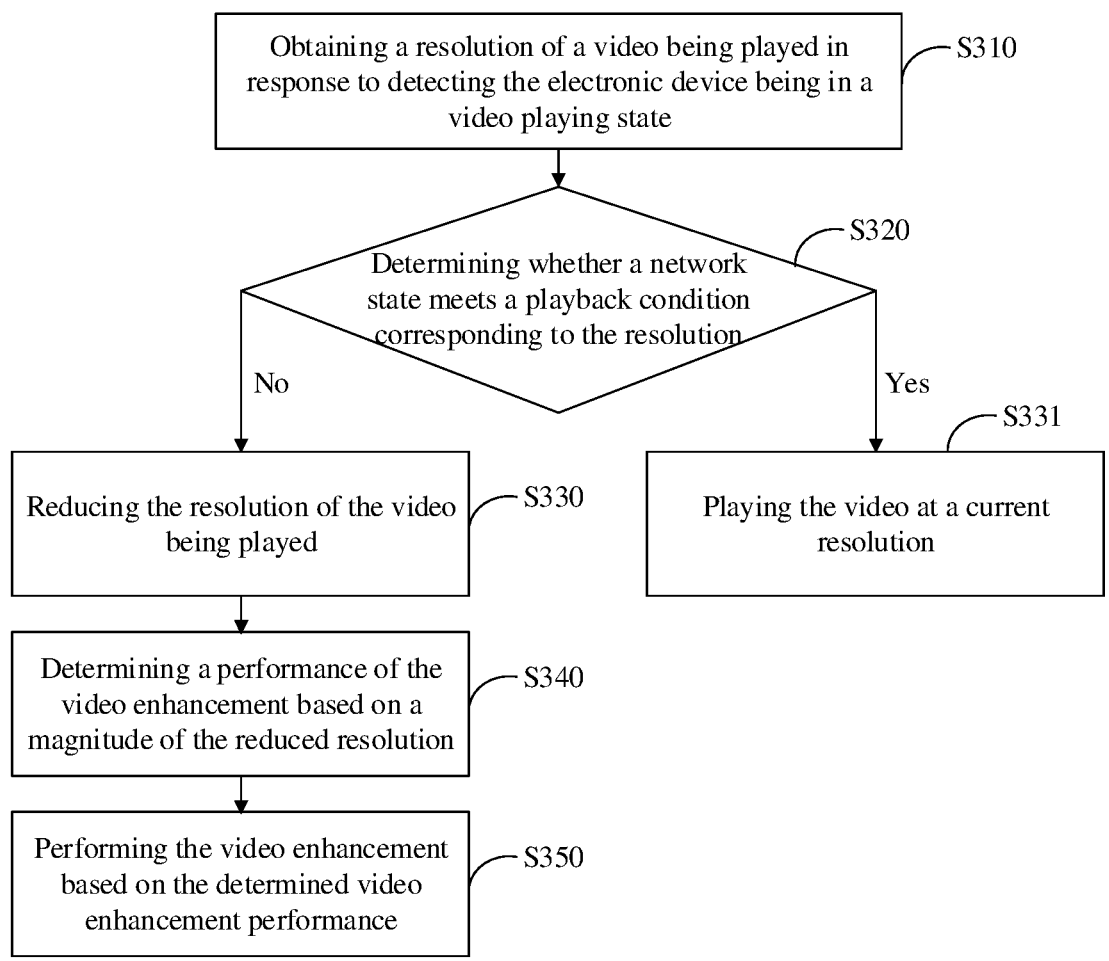
FIG. 6 is a flowchart of a video enhancement control method according to still another embodiment of the present disclosure.

Referring to FIG. 6, some embodiments of the present disclosure provide a video enhancement control method configured to be applied to an electronic device, including the following.

Step S310: obtaining a resolution of a video being played in response to detecting the electronic device being in a video playing state.

Step S320: determining whether a network state meets a playback condition corresponding to the resolution.

Step S330: if the network state does not meet the playback condition, reducing the resolution of the video being played.

Step S331: if the network state meets the playback condition, playing the video at a current resolution.

Step S340: determining a performance of the video enhancement based on a magnitude of the reduced resolution, wherein the greater the magnitude of the reduced resolution is, the stronger the determined performance of the video enhancement is.

It is understandable that the higher the resolution of the video, the better the video performance. In the case of a larger resolution reduction, the rendered video performance can be worse. In this case, a greater degree of video enhancement performance is required to ensure a higher visual experience of the video. For example, in the case where the resolution selected by the user is ultra-definition, a ultra-definition resolution is reduced to a video enhancement range corresponding to standard-definition. This can be greater than the video enhancement range corresponding to reducing the ultra-definition to high-definition, and the corresponding enhancement performance can be stronger.

Step S350: performing the video enhancement based on the determined video enhancement performance.

Some embodiments of the present disclosure provide a video enhancement control method. The method includes obtaining a resolution of a video being played in response to detecting the electronic device being in a video playing state e, determining whether a network state meets a playback condition corresponding to the resolution, and if the network state does not meet the playback condition, reducing the resolution of the video being played, and based on the reduction of the resolution, the video to be played is enhanced. The method reduces a resolution of a currently video being played when detecting that a current network state does not meet the resolution of the video being played, so as to adapt to the current network state. The method also includes turning on a video enhancement, such that even when a network does not support a current resolution, the video being played can still have a higher playback visual performance, which improves a user experience.

Figure 7:
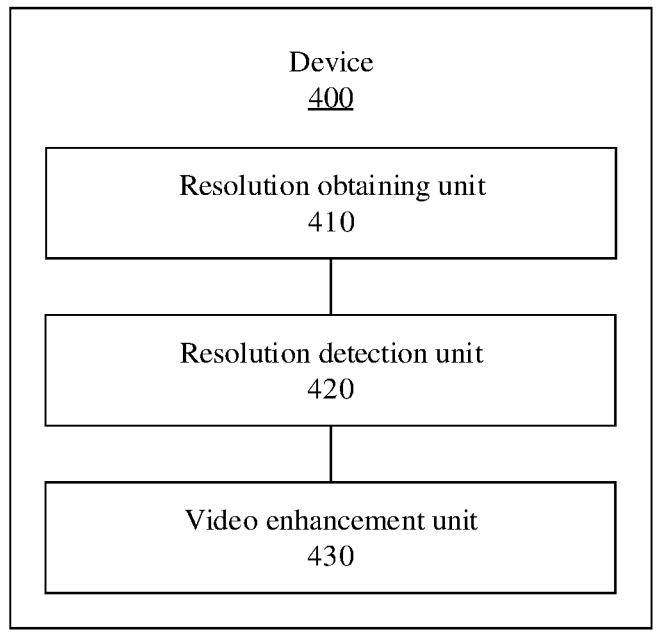
FIG. 7 is a structural block diagram of a video enhancement control device according to an embodiment of the present disclosure.

Referring to FIG. 7, some embodiments of the present disclosure provide a video enhancement control device 400 configured to run on an electronic device. The video enhancement control device 400 includes a resolution obtaining unit 410, a resolution detection unit 420, and a video enhancement unit 430.

The resolution obtaining unit 410 is configured to obtain a resolution of a video being played in response to detecting the electronic device being in a video playing state.

The resolution detection unit 420 is configured to determine whether a network state meets a playback condition corresponding to the resolution.

The video enhancement unit 430 is configured to reduce the resolution of the video being played and perform a video enhancement on the video being played if the network state does not meet the playback condition.

Some embodiments of the present disclosure provide a video enhancement control device. The video enhancement control device obtains a resolution of a video being played in response to detecting the electronic device being in a video playing state, determines whether a network state meets a playback condition corresponding to the resolution, and if the network state does not meet the playback condition, reduces the resolution of the video being played and performs a video enhancement on the video being played. The method reduces a resolution of a currently video being played when detecting that a current network state does not meet the resolution of the video being played, so as to adapt to the current network state. The method also includes turning on a video enhancement, such that even when a network does not support a current resolution, the video being played can still have a higher playback visual performance, which improves a user experience.

Figure 8:
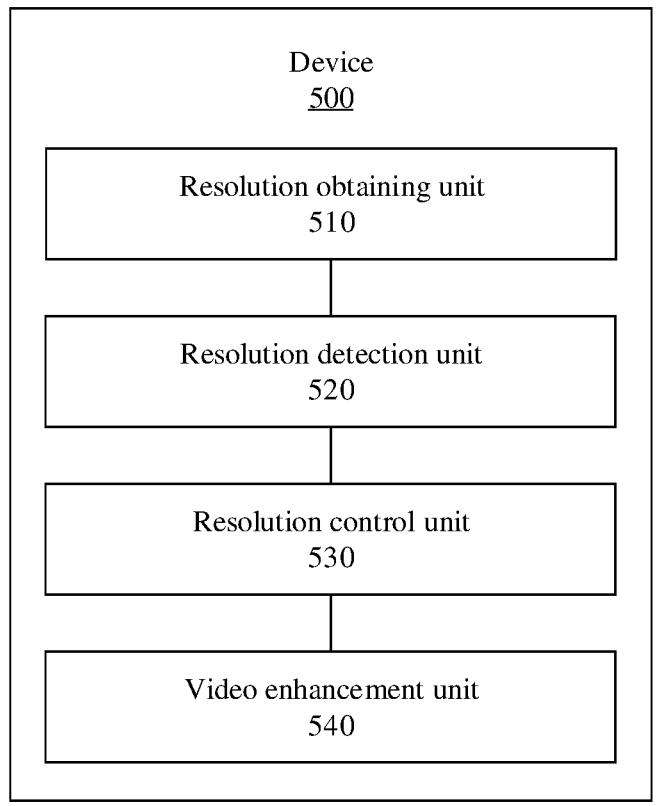
FIG. 8 is a structural block diagram of a video enhancement control device according to another embodiment of the present disclosure.

Referring to FIG. 8, some embodiments of the present disclosure provide a video enhancement control device 500 configured to run on an electronic device. The video enhancement control device 500 includes a resolution obtaining unit 510, a resolution detection unit 520, a resolution control unit 530, and a video enhancement unit 540.

The resolution obtaining unit 510 is configured to obtain a resolution of a video being played in response to detecting the electronic device being in a video playing state.

The resolution detection unit 520 is configured to determine whether a network state meets a playback condition corresponding to the resolution.

The resolution control unit 530 is configured to reduce the resolution of the video being played if the network state does not meet the playback condition.

The video enhancement unit 540 is configured to perform a video enhancement on the video being played if the network state does not meet the playback condition.

The resolution control unit 530 is further configured to increase the resolution of the video being played if it is determined that the current network state meets the playback condition.

As a way, the resolution control unit 530 is further configured to increase the resolution of the video being played to a target resolution if it is determined that the current network state meets the playback condition.

As a way, the video enhancement unit 540 is further configured to: if it is determined that the current network state meets the playback condition, after the step of increasing the resolution of the video being played, the method further includes: stopping performing the video enhancement on the video being played.

Optionally, the video enhancement unit 540 is further configured to obtain a parameter of the video image, determine the time when the video enhancement is turned off based on the parameter, and start to turn off the video enhancement for the video being played at the time.

As a way, the video enhancement unit 540 is further configured to determine whether a brightness of the video image is lower than a designated brightness, if determining that the brightness of the video image is lower than the designated brightness, a time when the brightness of the video image is detected to be lower than the designated brightness is regarded as the time to turn off the video enhancement.

Optionally, the video enhancement unit 540 is further configured to: if determining that the brightness of the video image is lower than the designated brightness, obtaining multiple frames of video images after the time when the brightness of the video image is detected to be lower than the designated brightness, calculating a duration of a brightness lower than the designated brightness based on a brightness of the multiple frames of video images, and if determining that the duration is greater than a designated duration, a time when the brightness of the video image is detected to be lower than the designated brightness is regarded as the time to turn off the video enhancement.

It is understandable that when the brightness of the video image is lower than the designated brightness, a user identification of the content of the video image is worse than when the brightness of the video image is higher than the designated brightness. For example, when the content displayed on the video image is in the daytime, a user perception is more sensitive to whether the video image is clear. When the content displayed on the video image is at night, the user has a poor perception of the definition of the video. In this case, if the time when the brightness of the video image is detected to be lower than the designated brightness is regarded as the time to turn off the video enhancement, a probability of user identification can be reduced when the video enhancement is turned off. This makes it possible to complete a shutdown of the video enhancement when the user has no or little perception, so as to improve a user experience.

Some embodiments of the present disclosure provide a video enhancement control device. The video enhancement control device obtains a resolution of a video being played in response to detecting the electronic device being in a video playing state, determines whether a network state meets a playback condition corresponding to the resolution, and if the network state does not meet the playback condition, reduces the resolution of the video being played and performs a video enhancement on the video being played. When it is detected that the network meets the playback condition again, the resolution of the video being played is increased, and the video enhancement performance is reduced according to the increase in resolution, thereby reducing power consumption. The method reduces a resolution of a currently video being played when detecting that a current network state does not meet the resolution of the video being played, so as to adapt to the current network state. The method also includes turning on a video enhancement, such that even when a network does not support a current resolution, the video being played can still have a higher playback visual performance, which improves a user experience.

Figure 9:
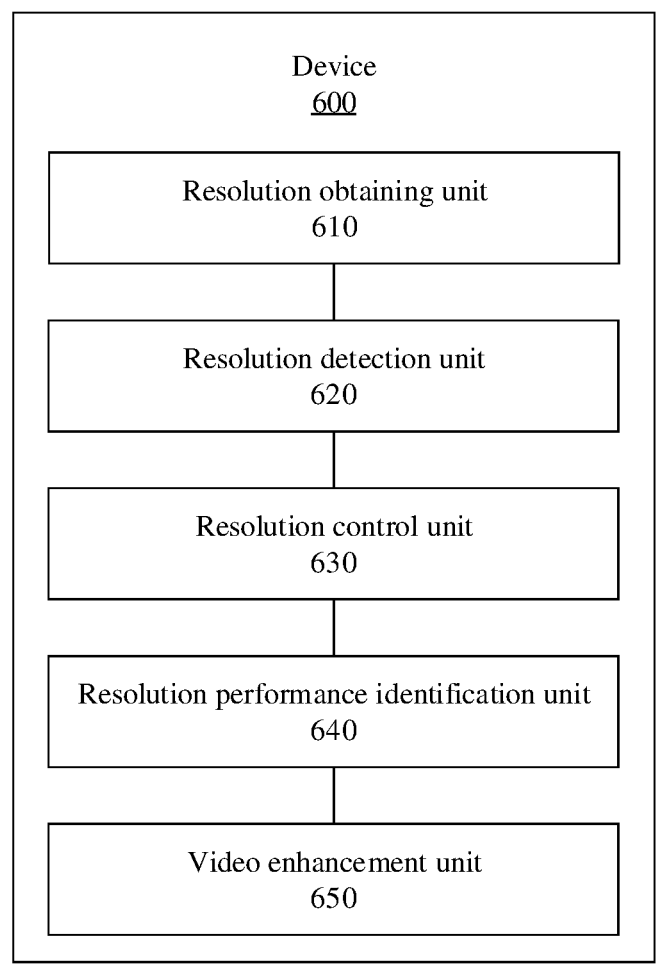
FIG. 9 is a structural block diagram of a video enhancement control device according to still another embodiment of the present disclosure.

Referring to FIG. 9, some embodiments of the present disclosure provide a video enhancement control device 600 configured to run on an electronic device. The video enhancement control device 600 includes a resolution obtaining unit 610, a resolution detection unit 620, a resolution control unit 630, a resolution performance identification unit 640, and a video enhancement unit 650.

The resolution obtaining unit 610 is configured to obtain a resolution of a video being played in response to detecting the electronic device being in a video playing state.

The resolution detection unit 620 is configured to determine whether a network state meets a playback condition corresponding to the resolution.

The resolution control unit 630 is configured to reduce the resolution of the video being played if the network state does not meet the playback condition.

The resolution performance identification unit 640 is configured to determine a performance of the video enhancement based on a magnitude of the reduced resolution, wherein the greater the magnitude of the reduced resolution is, the stronger the determined performance of the video enhancement is.

The video enhancement unit 650 is configured to perform the video enhancement based on the determined video enhancement performance.

Some embodiments of the present disclosure provide a video enhancement control device. The video enhancement control device obtains a resolution of a video being played in response to detecting the electronic device being in a video playing state, determines whether a network state meets a playback condition corresponding to the resolution, and if the network state does not meet the playback condition, reduces the resolution of the video being played, and performs a video enhancement on the video being played based on the reduction of the resolution. The method reduces a resolution of a currently video being played when detecting that a current network state does not meet the resolution of the video being played, so as to adapt to the current network state. The method also includes turning on a video enhancement, such that even when a network does not support a current resolution, the video being played can still have a higher playback visual performance, which improves a user experience.

Those skilled in the art can clearly understand that, for convenience and conciseness of the description, the detailed working processes of the devices and units described above can refer to the corresponding processes in the foregoing method embodiments, and a description in this regard is not repeated here. In the several embodiments provided by the present disclosure, the coupling between the modules may be electrical. In addition, the various functional modules in the various embodiments of the present disclosure may be integrated into one processing module, or each module may exist alone physically, or two or more modules may be integrated into one module. The above-mentioned integrated modules may be implemented in the form of hardware or software functional modules.

It is noted that encoding audio data according to the audio coding type in some embodiments of the present disclosure can adopt the currently existing technology, and a description in this regard is not provided in detail in some embodiments of the present disclosure.

In summary, some embodiments of the present disclosure provide a video enhancement control method, a device, an electronic device, and a storage medium. The method includes obtaining a resolution of a video being played in response to detecting the electronic device being in a video playing state, determining whether a network state meets a playback condition corresponding to the resolution, and if the network state does not meet the playback condition, reducing the resolution of the video being played and performing a video enhancement on the video being played. The method reduces a resolution of a currently video being played when detecting that a current network state does not meet the resolution of the video being played, so as to adapt to the current network state. The method also includes turning on a video enhancement, such that even when a network does not support a current resolution, the video being played can still have a higher playback visual performance, which improves a user experience.

A description of an electronic device according to some embodiments of the present disclosure is provided with reference to FIG. 10 as follows.

Figure 10:
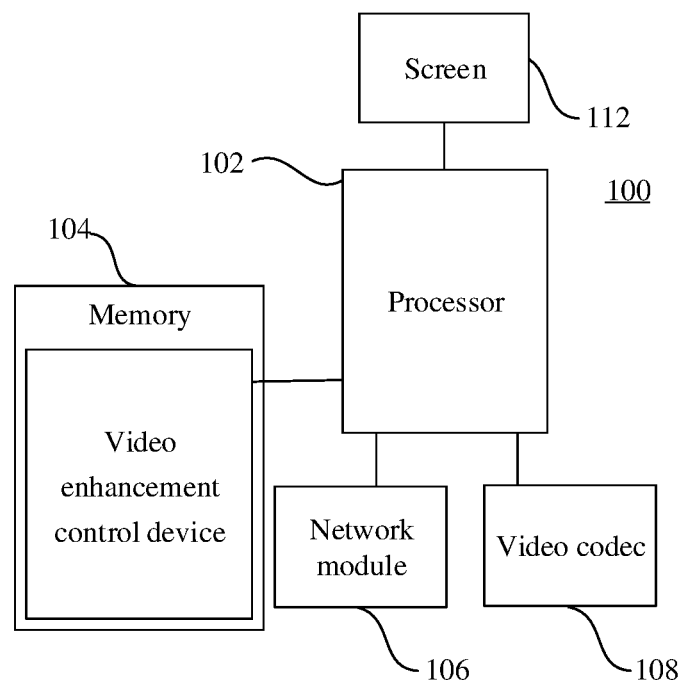
FIG. 10 is a structural block diagram of an electronic device configured to execute a video enhancement control method according to an embodiment of the present disclosure.

Referring to FIG. 10, based on the above video enhancement control method and the device, an embodiment of the present disclosure further provides an electronic device 100 that can perform the above video enhancement control method. The electronic device 100 includes one or more (only one is illustrated in the figure) processors 102, a memory 104, a network module 106, a video codec (coder and/or decoder) 108, and a screen 112 that are coupled to one other. A program that can execute the contents of the foregoing embodiments is stored in the memory 104, and the processor 102 can execute the program stored in the memory 104.

The processor 102 may include one or more processing cores. The processor 102 utilizes various interfaces and lines to connect various parts of the entire electronic device 100, and executes various functions of the electronic device 100 and processes data through running or executing instructions, programs, code sets, or instruction sets stored in the memory 104 and calling data stored in the memory 104. Optionally, the processor 102 may be implemented in a hardware form by using at least one of a digital signal processor (DSP), a field-programmable gate array (FPGA), and a programmable logic array (PLA). The processor 102 may be a combination by integrating one or more of a central processing unit (CPU), a graphics processor unit (GPU) and a modem, etc. The CPU mainly processes the operating system, the user interface, and application programs, etc.; the GPU is configured to render and depict the display content; the modem is configured to process wireless communication. It can be understood that the above modem may not be integrated into the processor 102 but may be implemented by a communication chip alone.

The memory 104 may include a random access memory (RAM) or may include a read-only memory. The memory 104 may be configured to store instructions, programs, codes, code sets or instruction sets. The memory 104 may include a program storage area and a data storage area. For example, a video enhancement control device may be stored in the memory 104. The video enhancement control device may be the above device 400, device 500, or device 600. The program storage area can store instructions used for implementing the operating system, instructions used for realizing at least one function (such as touch function, sound playback function, image playback function, etc.), instructions used for implementing the following various method embodiments, etc. The data storage area can store data created by the electronic device 100 during use (such as phone book, audio and video data, chat record data), etc.

The network module 106 is configured to receive and send electromagnetic waves, realize the mutual conversion between electromagnetic waves and electrical signals, so as to communicate with a communication network or some other devices, for example, communicate with a wireless access point. The network module 106 may include various currently existing circuit elements for performing these functions, such as an antenna, a radio frequency transceiver, a digital signal processor, an encryption/decryption chip, a subscriber identity module (SIM) card, a memory, etc. The network module 106 can communicate with various networks, such as the Internet, an intranet, a wireless network, or communicate with some other device through a wireless network. The wireless network may include a cellular telephone network, a wireless local area network, or a metropolitan area network.

The video codec 108 may be configured to decode data requested by the network module 106 from the network, so that it can be transmitted to the screen 112 for display. In greater detail, the video codec 108 may be a GPU, a specific DSP, an FPGA, an ASIC chip, etc.

Figure 11:
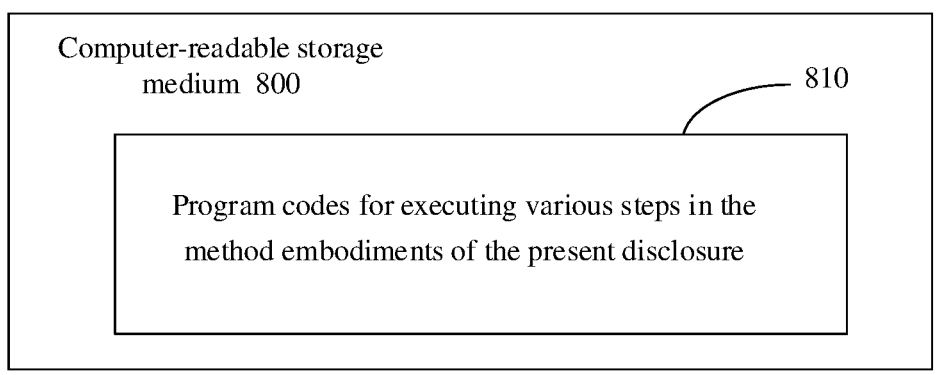
FIG. 11 is a storage unit configured to store or carry a program code for implementing a video enhancement control method according to an embodiment of the present disclosure.

Referring to FIG. 11, which illustrates a structural block diagram of a computer-readable storage medium according to an embodiment of the present disclosure. A computer-readable storage medium 800 stores program codes, and the program codes can be called by the processor to perform the methods described in the foregoing method embodiments.

The computer-readable storage medium 800 may be an electronic memory, such as a flash memory, an electrically erasable programmable read only memory (EEPROM), an erasable programmable read only memory (EPROM), a hard disk, or a read only memory (ROM). Optionally, the computer-readable storage medium 800 includes a non-transitory computer-readable storage medium. The computer-readable storage medium 800 has a storage space for executing program codes 810 of any method step in the above-mentioned methods. These program codes can be read from one or more computer program products or written into the one or more computer program products. The program codes 810 may be, for example, compressed in a suitable form.

In the above, it should be noted that the above embodiments are only used to illustrate technical solutions of the present disclosure. However, the present disclosure is not limited to the technical solutions. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A video enhancement control method for an electronic device, comprising:
    obtaining a resolution of a video being played in response to detecting the electronic device being in a video playing state;
    determining whether a network state meets a playback condition corresponding to the resolution;
    if the network state does not meet the playback condition, reducing the resolution of the video being played and performing a video enhancement on the video being played, the video enhancement comprising enhancing images of the video being played;
    if determining that a brightness of the video image is lower than a designated brightness, obtaining multiple frames of video images after a time when the brightness of the video image is detected to be lower than the designated brightness;
    calculating a duration of a brightness lower than the designated brightness based on a brightness of the multiple frames of video images; and
    if determining that the duration is greater than a designated duration, the time when the brightness of the video image is detected to be lower than the designated brightness is regarded as a time to turn off the video enhancement.

2. The method as claimed in claim 1, further comprising: increasing the resolution of the video being played if determining that a current network state meets the playback condition.

3. The method as claimed in claim 2, wherein the increasing the resolution of the video being played if determining that the current network state meets the playback condition comprises:
increasing the resolution of the video being played to a target resolution if determining that the current network state meets the playback condition.

4. The method as claimed in claim 2, after the increasing the resolution of the video being played to the target resolution if determining that the current network state meets the playback condition, the method further comprising:
stopping performing the video enhancement on the video being played.

5. The method as claimed in claim 4, wherein the stopping performing the video enhancement on the video being played comprises:
obtaining a parameter of the video image;
determining the time to turn off the video enhancement based on the parameter; and
turning off the video enhancement of the video being played when the time starts.

6. The method as claimed in claim 5, wherein the parameter comprises the brightness, and the determining the time to turn off the video enhancement based on the parameter comprises:
determining whether the brightness of the video image is lower than the designated brightness; and
if determining that the brightness of the video image is lower than the designated brightness, the time when the brightness of the video image is detected to be lower than the designated brightness is regarded as the time to turn off the video enhancement.

7. The method as claimed in claim 1, wherein if the network state does not meet the playback condition, the reducing the resolution of the video being played and performing the video enhancement on the video being played comprises:
reducing the resolution of the video being played if the network state does not meet the playback condition;
determining a performance of the video enhancement based on a magnitude of the reduced resolution, wherein the greater the magnitude of the reduced resolution is, the stronger the determined performance of the video enhancement is; and
performing the video enhancement based on the determined performance of the video enhancement.

8. The method as claimed in claim 1, wherein the performing the video enhancement on the video being played, and the video enhancement comprising enhancing the image of the video being played comprises:
adjusting an image parameter of the video being played to enhance the image.

9. The method as claimed in claim 8, wherein the image parameter comprises at least one of a definition adjustment parameter, a lens distortion control parameter, a color gamut control parameter, a color adjustment parameter, a sharpness adjustment parameter, a brightness adjustment parameter, a contrast adjustment parameter, a noise reduction control parameter, and a saturation adjustment parameter.

10. The method as claimed in claim 1, wherein the obtaining the resolution corresponding to the video being played comprises:
obtaining a resolution of one frame of the video being played as a first resolution to be compared;
obtaining a resolution selected by a characterization user stored locally as a second resolution to be compared;
comparing the first resolution to be compared with the second resolution to be compared;
if the first resolution to be compared is same as the second resolution to be compared, taking any one of the first resolution to be compared and the second resolution to be compared as the resolution corresponding to the video being played; and
if the first resolution to be compared is not the same as the second resolution to be compared, using the first resolution to be compared as the resolution corresponding to the video being played.

11. The method as claimed in claim 1, wherein the determining whether the network state meets the playback condition corresponding to the resolution comprises:
obtaining a transmission rate corresponding to the resolution of the video being played;
obtaining a transmission rate of a currently connected network;
comparing the transmission rate of the currently connected network with the transmission rate corresponding to the resolution of the video being played;
if the transmission rate of the currently connected network is not less than the transmission rate corresponding to the resolution of the video being played, determining that the network state meets the playback condition corresponding to the resolution; and
if the transmission rate of the currently connected network is less than the transmission rate corresponding to the resolution of the video being played, determining that the network state does not meet the playback condition corresponding to the resolution.

12. The method as claimed in claim 1, further comprising:
if the network state meets the playback condition, playing the video at a current resolution.

13. The method as claimed in claim 1, wherein before the obtaining the resolution of the video being played in response to detecting the electronic device being in the video playing state, the method further comprises:
detecting whether a set video playback application is running; and
if detecting that the set video playback application is running, determining that the video in the playing state.

14. The method as claimed in claim 1, wherein before the obtaining the resolution of the video being played in response to detecting the electronic device being in the video playing state, the method further comprises:
obtaining an application program currently running in a foreground;
detecting whether the application program is in a pre-established list of video playback applications; and
if yes, determining that the video in the playing state.

15. The method as claimed in claim 1, wherein before the obtaining the resolution of the video being played in response to detecting the electronic device being in the video playing state, the method further comprises:
detecting whether there is an audio output;
if yes, detecting whether there is a video playback application running; and
if yes, determining that the video in the playing state.

16. An electronic device comprising one or more processors, a video codec, and a memory; and
  one or more program instructions stored in the memory and executable by the one or more processors to perform operations comprising:
  obtaining a resolution of a video being played in response to detecting the electronic device being in a video playing state;
  determining whether a network state meets a playback condition corresponding to the resolution;
  if the network state does not meet the playback condition, reducing the resolution of the video being played and performing a video enhancement on the video being played, and the video enhancement comprising enhancing images of the video being played;
  if determining that a brightness of the video image is lower than a designated brightness, obtaining multiple frames of video images after a time when the brightness of the video image is detected to be lower than the designated brightness;
  calculating a duration of a brightness lower than the designated brightness based on a brightness of the multiple frames of video images; and
  if determining that the duration is greater than a designated duration, the time when the brightness of the video image is detected to be lower than the designated brightness is regarded as a time to turn off the video enhancement.

17. The electronic device as claimed in claim 16, wherein the one or more program instructions stored in the memory and executable by the one or more processors to perform operations further comprising: increasing the resolution of the video being played if determining that a current network state meets the playback condition.

18. The electronic device as claimed in claim 17, wherein the increasing the resolution of the video being played if determining that the current network state meets the playback condition comprises:
  increasing the resolution of the video being played to a target resolution if determining that the current network state meets the playback condition.

19. A non-transitory computer-readable medium, comprising program instructions stored thereon for performing at least the following:
  obtaining a resolution of a video being played in response to detecting the electronic device being in a video playing state;
  determining whether a network state meets a playback condition corresponding to the resolution;
  if the network state does not meet the playback condition, reducing the resolution of the video being played and performing a video enhancement on the video being played, the video enhancement comprising enhancing images of the video being played;
  if determining that a brightness of the video image is lower than a designated brightness, obtaining multiple frames of video images after a time when the brightness of the video image is detected to be lower than the designated brightness;
  calculating a duration of a brightness lower than the designated brightness based on a brightness of the multiple frames of video images; and
  if determining that the duration is greater than a designated duration, the time when the brightness of the video image is detected to be lower than the designated brightness is regarded as a time to turn off the video enhancement.

* * * * *